United States Patent
Smith et al.

(10) Patent No.: US 9,794,903 B2
(45) Date of Patent: Oct. 17, 2017

(54) SYNCHRONIZATION OF DISTRIBUTED NODES

(71) Applicant: Ziva Corporation, San Diego, CA (US)

(72) Inventors: David Smith, Ellicott City, MD (US); Anis Husain, San Diego, CA (US); Jeremy Rode, San Diego, CA (US); Mark Hsu, La Jolla, CA (US)

(73) Assignee: ZIVA CORP., San Diego, CA (US)

( * ) Notice: Subject to any disclaimer, the term of this patent is extended or adjusted under 35 U.S.C. 154(b) by 273 days.

(21) Appl. No.: 14/476,738

(22) Filed: Sep. 4, 2014

(65) Prior Publication Data
US 2015/0085853 A1 Mar. 26, 2015

Related U.S. Application Data

(60) Provisional application No. 61/881,393, filed on Sep. 23, 2013.

(51) Int. Cl.
*H04W 56/00* (2009.01)
*H04B 7/02* (2017.01)
(Continued)

(52) U.S. Cl.
CPC ........ *H04W 56/0025* (2013.01); *H04B 7/024* (2013.01); *H04W 56/0015* (2013.01); *H04W 84/18* (2013.01)

(58) Field of Classification Search
CPC ........ H04B 10/25755; H04B 10/25758; H04B 7/024; H04W 56/0015; H04W 56/0025; H04W 84/18
See application file for complete search history.

(56) References Cited

U.S. PATENT DOCUMENTS 7,317,876 B1   1/2008  Elliott
8,195,112 B1   6/2012  Zhang et al.
(Continued)

FOREIGN PATENT DOCUMENTS

WO   2007/059508 A1   5/2007
WO   2012/151316 A1   11/2012
WO   2013/009283 A1   1/2013

OTHER PUBLICATIONS

European Search Report on European Patent Application No. EP 14 185 802.7, All Pages.
(Continued)

*Primary Examiner* — Awet Haile
(74) *Attorney, Agent, or Firm* — Anatoly S. Weiser, Esq.; Techlaw LLP

(57) ABSTRACT

Dynamic, untethered array nodes are frequency, phase, and time aligned/synchronized, and used to focus their transmissions of the same data coherently on a target or in the target's direction, using time reversal or directional beamforming. Information for alignment/synchronization may be sent from a master node of the array to other nodes, over non-RF links, such as optical and acoustic links. Some nodes may be connected directly to the master nodes, while other nodes may be connected to the master node through one or more transit nodes. A transit nodes may operate to (1) terminate the link when the alignment/synchronization information is intended for the node, and (2) pass through the alignment/synchronization information to another node without imposing its local clock properties on the passed through alignment/synchronization information. In this way, an end point node may be aligned/synchronized to the master node without a direct link between the two nodes.

17 Claims, 11 Drawing Sheets

(51) Int. Cl.
H04B 7/024 (2017.01)
H04W 84/18 (2009.01)

(56) References Cited

U.S. PATENT DOCUMENTS

| | | | |
|---|---|---|---|
| 9,201,132 | B2 | 12/2015 | Hsu et al. |
| 9,497,722 | B2 | 11/2016 | Husain et al. |
| 9,548,799 | B2 | 1/2017 | Hsu et al. |
| 2001/0033248 | A1 | 10/2001 | Owechko |
| 2004/0096222 | A1* | 5/2004 | Cagenius ......... H04B 10/25758 398/115 |
| 2006/0117113 | A1* | 6/2006 | Elliott ..................... H04L 1/22 709/239 |
| 2008/0003948 | A1 | 1/2008 | Mitran |
| 2012/0127020 | A1 | 5/2012 | Paek et al. |
| 2013/0034358 | A1* | 2/2013 | Sung .................. H04W 88/085 398/115 |
| 2013/0122917 | A1* | 5/2013 | Yavuz .................. H04J 3/0638 455/450 |
| 2013/0195447 | A1* | 8/2013 | Ashwood-Smith ............... H04Q 11/0005 398/34 |
| 2014/0126567 | A1 | 5/2014 | Husain et al. |
| 2014/0301494 | A1 | 10/2014 | Hsu et al. |
| 2015/0208431 | A1 | 7/2015 | Chen et al. |

OTHER PUBLICATIONS

Paek et al., Distributed Time Reversal Mirror Array, IEEE Radar Conf., 2010, 627-630.
Collaborative Beamfocusing Radios (COBRA): A reciprocity based distributed beamforming system, Rode, Gregorian, Ward, Husain, Jan. 24-27, 2016 (all pages).
Collaborative Beamfocusing Radio (COBRA), Rode, Hsu, Smith, Husain, May 28, 2013.
IEEE XPlore, Mar. 31, 2016, citation of Collaborative Beamfocusing Radios (COBRA): A reciprocity based distributed beamforming system, Rode et al., (acc. Nov. 17, 2016, all pages).
SPIE citation of Collaborative Beamfocusing Radio (COBRA), Rode, Hsu, Smith, Husain, May 28, 2013 (accessed Nov. 17, 2016, all pages).

* cited by examiner

SYNCHRONIZATION OF DISTRIBUTED NODES

REFERENCE TO RELATED APPLICATIONS

The present application claims priority from U.S. Provisional Patent Application Ser. No. 61/881,393, entitled APPARATUS, METHODS, AND ARTICLES OF MANUFACTURE FOR COLLABORATIVE ARRAY COMMUNICATIONS INLUDING BEAMFOCUSING OF EMISSIONS, filed on 23 Sep. 2013, which is hereby incorporated by reference in its entirety as if fully set forth herein, including text, figures, claims, tables, and computer program listing appendices (if present), and all other matter in the United States provisional patent application.

FIELD OF THE INVENTION

This document relates generally to communications. In particular, this document relates to alignment (time, frequency, and/or phase synchronization) of untethered radio frequency (RF) communication nodes of an array.

BACKGROUND

The use of multiple transmit/receive antennas in wireless networks promises mitigation of interference and improved spectral efficiencies through focusing signals along a designated direction (directional beamforming or focusing), or on an intended receiver (location-or spot-focusing). Compared to single-antenna-to-single-antenna transmissions, transmit beamforming may yield increased range (e.g., an N-fold increase for free-space propagation), increased rate (e.g., an $N^2$-fold increase in a power-limited regime), increased power efficiency (e.g., an N-fold decrease in the net transmitted power for a fixed received power), and/or may allow splitting a high data-rate stream into multiple lower data-rate streams. (Here, N is the number of cooperative nodes or antenna elements at the transmit side.)

Distributed coherent RF transmit beamforming is a form of cooperative communication in which two or more nodes (that is, nodes of a node array) simultaneously transmit a common message, controlling the phase and timing of their transmissions so that the transmitted signals constructively combine at an intended destination.

In the case of directional beamforming, the individual array nodes are configured as a phased array to produce a beam that is approximately collimated in a given direction, but the beam is not specifically focused to maximize power at a given location of the target receiver. Phased arrays where the locations of the individual array elements and the target receiver are known, where the array elements are interconnected with cables or other calibrated interconnections (e.g., hardwired), and where a common centralized clock/time reference can be distributed among the array elements, can be configured to operate in such directional beamforming modes.

Decentralized arrays may be much more difficult to use as coherent beamforming phased arrays, either in transmit mode or receive mode. In a decentralized array, the individual nodes are untethered devices with independent clocks, i.e., without a distributed/hardwired clock or frequency reference. Additionally, in a decentralized array the precise positional coordinates of each node may be unknown and/or varying in time. Decentralized cooperative arrays and their operation for radio frequency (RF) communications are described in several commonly-owned and related patent documents, including the following:

1. International Patent Publication WO/2012/151316 (PCT/US2012/36180), entitled DISTRIBUTED CO-OPERATING NODES USING TIME REVERSAL, filed 2 May 2012;
2. U.S. patent application Ser. No. 14/114,901, Publication Number 2014-0126567, entitled DISTRIBUTED CO-OPERATING NODES USING TIME REVERSAL, filed on 8 May 2014;
3. U.S. Provisional Patent Application Ser. No. 61/481,720, entitled DISTRIBUTED CO-OPERATING NODES USING TIME REVERSAL FOR COMMUNICATIONS, SENSING & IMAGING, filed on 2 May 2011;
4. U.S. Provisional Patent Application Ser. No. 61/540,307, entitled DISTRIBUTED CO-OPERATING NODES USING TIME REVERSAL FOR COMMUNICATIONS, SENSING & IMAGING, filed on 28 Sep. 2011;
5. U.S. Provisional Patent Application Ser. No. 61/809,370, entitled APPARATUS, METHODS, AND ARTICLES OF MANUFACTURE FOR COLLABORATIVE BEAMFOCUSING OF RADIO FREQUENCY EMISSIONS OF RADIO FREQUENCY EMISSIONS, filed on 7 Apr. 2013;
6. U.S. Provisional Patent Application Ser. No. 61/829,208, entitled APPARATUS, METHODS, AND ARTICLES OF MANUFACTURE FOR COLLABORATIVE BEAMFOCUSING OF RADIO FREQUENCY EMISSIONS, filed on 30 May 2013;
7. International Patent Application PCT/US2014/33234, entitled DISTRIBUTED CO-OPERATING NODES USING TIME REVERSAL, filed 7 Apr. 2014; and
8. U.S. patent application Ser. No. 14/247,229, entitled DISTRIBUTED CO-OPERATING NODES USING TIME REVERSAL, filed on 7 Apr. 2014.

Each of the patent documents described above is hereby incorporated by reference, including Specification, Claims (if present), Figures, Tables (if present), and all other matter. We may refer to these documents collectively as "incorporated applications" or "related patent documents."

Several tasks may be necessary or desirable for a decentralized cooperative array of nodes to operate as a directional beamforming or spot-focusing array. First, a decentralized array may need to acquire channel information between the individual array nodes and the intended target/source, and provide a mechanism for the nodes to transmit/receive a correctly-weighted signal at each of the array nodes (or "elements," or "members," which terms are used interchangeably), so that beamforming or focusing is achieved to within some predetermined or variable accuracy required by the system's specification or applications.

Second, the information to be transmitted by the decentralized array to a target may need to be distributed across the array (i.e., to the individual nodes). Alternatively, when the array is used for receiving transmissions, the data may need to be collected from the different nodes of the decentralized array.

Third, some control operations may need to be performed across the array.

Fourth, the individual nodes of the decentralized array should be phase-aligned, frequency-aligned, and time-aligned, to enable the array to operate in a coherent manner. Achieving and maintaining such alignment/synchronization and coordination of the array nodes is important to the correct operation of the array.

Some inter-nodal communications are needed in such systems. The requirements applicable to the procedures used in the inter-nodal communications may be rather strict, especially those that are imposed by the need to achieve and maintain alignment/synchronization of the different nodes. In an array of nodes, exceeding the clock coherence limit may manifest as a random scrambling of the phases of the carrier waves utilized in the beamforming or focusing, and a failure to achieve optimal or even minimally-acceptable performance. Even with atomic clocks and with fixed locations of the nodes, the coherence limit is eventually reached, requiring re-alignment of the clocks. In sum, a method used for alignment/synchronization should be fast enough to maintain the alignment required for acceptable communication operation of the array, given the coherence specifications of the clocks of the individual nodes. Moreover, there are other factors that may shorten the time between successive re-alignments, such as the movement of the nodes and the dynamic changes in the channel responses.

Improved techniques for communications between and among nodes are desirable, in particular improved techniques for time- phase-, and/or frequency-aligning/synchronizing the nodes and maintaining their alignment/synchronization in dynamic environments. Thus, needs exist in the art for improved node-to-node communication techniques for distributed coherent communications between an array of nodes and communication apparatus external to the array; for apparatus, methods, and articles of manufacture enabling such improved communications; and for phase/frequency alignment/synchronization techniques that can be used in ad hoc nodes of a distributed array for coherent communications.

SUMMARY

Embodiments, variants, and examples described in this document are directed to methods, apparatus, and articles of manufacture that may satisfy one or more of the above described and/or other needs.

In exemplary embodiments, dynamic, untethered nodes of an array are frequency, phase, and time aligned/synchronized, and used to focus their transmissions coherently on a target or in the target's direction, using time reversal for location-focusing or directional beamforming. Information for alignment/synchronization may be sent from a master node of the array to other nodes, over non-RF links, such as optical and acoustic links. These nodes may operate as Endpoint Nodes (or end nodes) or as Transit Nodes. Some nodes may be connected by the non-RF links directly (that is, without the signal traveling through any other array nodes) to the master node, while other nodes may be connected to the master node through several non-RF links and one or more intermediate transit nodes. An end point node may operate to terminate a link when the alignment/synchronization information on the link is intended for that node. If the node operates to pass through the alignment/synchronization information on the link to another node over another link, without imposing the local clock properties on the passed-through alignment/synchronization information, the node operates as a Transit Node. A node may operate as a transit node and as an end point node. In this way, an end point node may be aligned/synchronized to the master node without a direct link between the two nodes.

In an embodiment, a method of synchronizing an array of at least three ad hoc nodes includes: (1) receiving from a master node of the array a first non-radio frequency (non-RF) signal carrying a first radio frequency (RF) signal, the step of receiving being performed at a first transit slave node of the array over a first non-RF side channel link, the first RF signal including properties of a local time reference of the master node; and (2) passing through at least a first portion of the first non-RF signal through the first transit slave to an end-point node without imposing clock properties of the first transit slave node on the first portion of the first non-RF signal, the first portion of the non-RF signal carrying at least a first portion of the first RF-signal, thereby enabling the end-point node to synchronize to the master node using the properties of the local time reference of the master node carried by the first portion of the first RF-signal.

In aspects, the method also includes terminating a second portion of the first non-RF signal at the first transit slave node. The step of terminating may be performed concurrently with the step of passing through.

In aspects, the step of passing through includes indirectly passing through the first portion of the first non-RF signal to the end-point node via at least one additional transit slave node.

In aspects, the step of passing through includes indirectly passing through the first portion of the first non-RF signal to the end-point node via at least one additional transit slave node.

In aspects, the step of passing through includes separating the first portion of the first non-RF signal from the second portion of the first non-RF signal using an optical power splitter or a a wavelength filter.

In aspects, the method also includes synchronizing local time reference of the end-point node to the local time reference of the master node using the properties of the local time reference of the master node included in the first portion of the first RF-signal.

In aspects, the method also includes synchronizing local time reference of the first transit slave node to local time reference of the master node using the properties of the local time reference of the master node carried by the second portion of the first RF-signal.

In aspects, the method also includes transmitting the first portion of the first non-RF signal to the end-point node over a second non-RF side channel link; the first non-RF side channel link and the second non-RF side channel link are RF-over-optical or acoustic links.

In embodiments, a communication method includes synchronizing the array of the at least three ad hoc nodes as is described above. The method also includes distributing across the array common data for transmission to a target. The method further includes coherently transmitting from each node of the at least three ad hoc nodes of the array to the target RF signals carrying the common data, so that the signals carrying the common data add constructively in a general direction from the array to the target and/or in a general location of the target, the step of coherently transmitting including directional beamforming or location-focusing time-reversal.

In aspects, synchronizing the local time reference of the end-point node to the local time reference of the master node includes frequency, phase, and time alignment of the end-point node; and synchronizing the local time reference of the first transit slave node to the local time reference of the master node includes frequency, phase, and time alignment of the end-point node.

In an embodiment, a communication node includes at least one communication node processor; a communication node radio frequency (RF) transceiver coupled to the at least one processor; a communication node local time reference; and a communication node non-RF processing module coupled to the at least one communication node processor. The communication node non-RF processing module includes a non-RF splitter configured to separate a first non-RF signal received by the communication node into a first component terminated at the communication node, and a second component passed through the communication node, without imposing properties of the communication node local time reference on the second component.

In aspects, the non-RF splitter includes an optical power splitter or an optical wavelength filter.

In an embodiment, an array of at least three ad hoc nodes includes the communication node described above; a master node including at least one master node processor, a master node RF transceiver coupled to the at least one master node processor, a master node local time reference, and a master node non-RF processing module coupled to the at least one master node processor; and an end-point node including at least one end-point node processor, an end-point node RF transceiver coupled to the at least one end-point node processor, an end-point node local time reference, and an end-point node non-RF processing module coupled to the at least one end-point node processor. The master node is configured by the at least one master node processor to emit the first non-RF signal over a first non-RF side channel link, the first non-RF signal carrying an RF signal including properties of the master node local time reference. The communication node is configured by the at least one communication node processor to synchronize the communication node local time reference to the master node local time reference using the properties of the master node local time reference included in the first non-RF signal received by the communication node. The end-point node is configured by the at least one end-point node processor to synchronize the end-point node local time reference to the master node local time reference using the properties of the master node local time reference in the second component of the first non-RF signal passed through the communication node.

In aspects, the communication node, the master node, and the end-point node are configured to transmit coherently to a target RF signals carrying common data, so that the RF signals carrying the common data add constructively in a general direction from the array to the target and/or in a general location of the target.

In aspects, the communication node non-RF processing module, the master node non-RF processing module, and the end-point non-RF processing module are optical processing modules; and the first non-RF signal is an optical signal carrying an RF signal.

In aspects, the communication node non-RF processing module, the master node non-RF processing module, and the end-point non-RF processing module are acoustic processing modules; and the first non-RF signal is an acoustic signal carrying an RF signal. These and other features and aspects of the present invention will be better understood with reference to the following description, drawings, and appended claims.

DETAILED DESCRIPTION

Figure 1A:
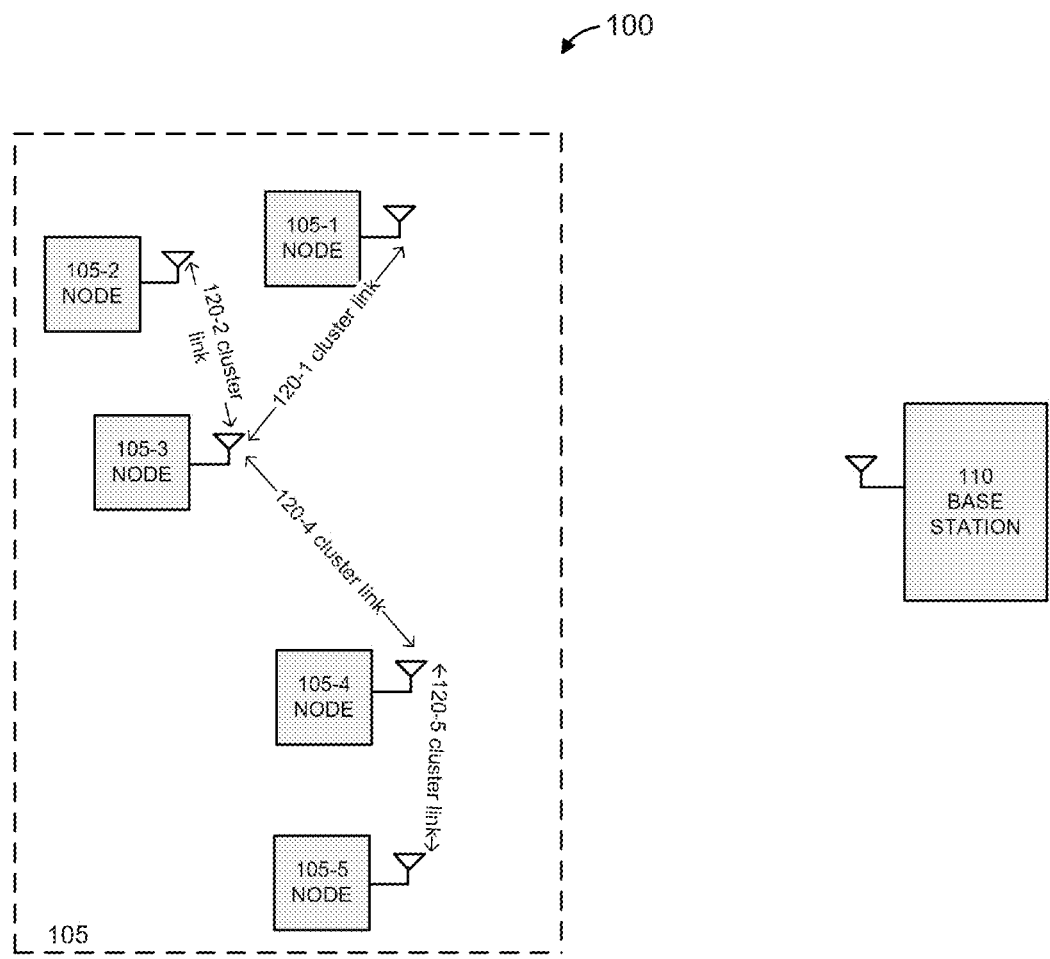
FIG. 1A illustrates selected components of a communication arrangement including a base station and a collaborative array.

In this document, the words "embodiment," "variant," "example," and similar words and expressions refer to a particular apparatus, process, or article of manufacture, and not necessarily to the same apparatus, process, or article of manufacture. Thus, "one embodiment" (or a similar expression) used in one place or context may refer to a particular apparatus, process, or article of manufacture; the same or a similar expression in a different place or context may refer to a different apparatus, process, or article of manufacture. The expression "alternative embodiment" and similar words and expressions are used to indicate one of a number of different possible embodiments, variants, or examples. The number of possible embodiments, variants, or examples is not necessarily limited to two or any other quantity. Characterization of an item as "exemplary" means that the item is used as an example. Such characterization does not necessarily mean that the embodiment, variant, or example is preferred; the embodiment, variant, or example may but need not be a currently preferred embodiment, variant, or example. All embodiments, variants, and examples are described for illustration purposes and are not necessarily strictly limiting.

The words "couple," "connect," and similar expressions and words with their inflectional morphemes do not necessarily import an immediate or direct connection, but include within their meaning connections through mediate elements.

The expression "processing logic" should be understood as selected steps and decision blocks and/or hardware/software/firmware for implementing the selected steps and decision blocks. "Decision block" means a step in which a decision is made based on some condition, and process flow may be altered based on whether the condition is met or not.

Array "nodes," "elements," and "members" are used interchangeably.

References to "receiver" ("Rx") and "transmitter" ("Tx") are made in the context of examples of data transmission from a transmitter to an intended or target receiver. For time-reversal communication techniques, the intended or target receiver may need to transmit to the transmitter a sounding signal, e.g., a pulse/burst or a pilot signal, and the transmitter may need to receive the sounding signal. Moreover, data communications can be bi-directional, with transceivers on both sides. In this document, the nodes of a cooperative array may be "transmitters" of data, which they transmit to an "intended receiver" (or "targeted receiver," "target Rx," or simply "target"), such as a base station. The roles may be reversed, with the cooperative array (or any of its nodes) also or instead being the intended or target receiver for the transmissions from one or more base stations. In the event that the ascribed meaning is different in a particular context, we will specify in the context what configuration is being discussed.

A "target" thus may be an entity that emits a sounding pulse, and may generally include both transmit and receive functionality. Note that although we may occasionally refer to a target (or equivalent terms, as mentioned above) in the singular, the general description of the processes and systems involved applies to multiple targets; as is discussed in this document and the related patent documents, an array of nodes may transmit to multiple targets at different times, simultaneously, and/or using transmissions that partially overlap in time. Note also that a target may be a source of cooperative and/or opportunistic transmissions used for "sounding." The "sounding" term is explained below.

Selected examples of communication processes and architectures described in this document and in the related patent documents allow an array of untethered radio frequency (RF) transmit-receive (Tx/Rx) nodes with independent and unsynchronized clocks to achieve phase alignment, frequency alignment, and time alignment (synchronization), enabling the nodes to operate as a coherent array. For location-focusing applications, the nodes may be configured to capture "sounding" signals from one or more targets, and use time-reversal (TR) to retrodirect energy automatically back to the target(s). In this way, the array of nodes may be able to achieve spatio-temporal focusing of the energy on the one or more targets. In this document, we designate the nodes of such an array as "ad hoc nodes," to signify that the ad hoc nodes have their own physical clocks, and the nodes are "untethered" in the sense that they may be (1) free to move, in absolute terms (e.g., with respect to a point with fixed GPS coordinates, and/or with respect to any or all of the targets), and to move with respect to each other, and (2) free to rotate around one or more axes. Some constraints on the movements of some or all of the nodes need not necessarily vitiate their untethered character; for example, nodes that are free to move in only one or two dimensions (and not all three dimensions) may still be ad hoc nodes, whether or not they rotate around any axis. Examples of such nodes may include radios carried by a squad of soldiers; radios onboard different aircrafts, water vessels or buoys, land vehicles, satellites; and similar nodes. The nodes may also be ad hoc even if they are not used in TR-communications; for example, nodes of a directional beamforming array may also be ad hoc nodes.

"Sounding" and its inflectional morphemes refer to transmitting a signal from the target and capturing the signal by the nodes of the array for the purpose of obtaining information about channels from the nodes to the target, for example, for forming TR signals. There are different modes of sounding. In accordance with the no-separation sounding approach, targets emit overlapped sounding signals, but the channel impulse responses (CIRs, or more generally, channel responses, CRs) might not be amenable to unique identification at the array nodes, and may be captured in a buffer at each node of the array. In accordance with a time-separated sounding approach, each target emits its sounding signal (e.g., a pulse or a pilot) at times sufficiently separated so that the nodes can deduce which target emitted the sounding signal from the timing of the received sounding signal. Each array node may acquire and store the channel response or the channel impulse response separately, with an identifier (ID) that identifies the target that emitted the sounding signal. This identification may be based on a separate protocol known to the array nodes. Examples of the protocols include a frequency ID list, and the protocol that establishes the sequence the targets send their sounding signals. This can be performed in both the heterodyne and homodyne modes. Other protocols may also be used. In accordance with a frequency-separated sounding approach, each target transmits overlapped or non-overlapped sounding signals, but the CRs can be uniquely identified by each node from different IF frequencies. In other words, the frequencies of the sounding transmissions differ from target to target, and the nodes can identify the different targets from the frequencies of the sounding transmissions. Additional sounding approaches include polarization-separation approach, signal labeling approach in accordance with which uniquely identifiable pulses from each of the targets are transmitted, and still other sounding approaches.

If the CRs (which term subsumes CIR) resulting from the different targets are separated at the nodes of the cooperative array by separate soundings (e.g., by different IF frequencies, or otherwise), the array can apply different data streams to the different CIR/CR sets corresponding to the different targets. For example, if a first target emits a signal and each node identifies and stores its copy of the CR resulting from this signal, then each node can convolve a first data stream with the node's copy of the CR of the first target. When the convolved signals of the array nodes are transmitted, after upconverting to the correct carrier frequency, the signals carrying the first data stream should be coherently focused (spatially and temporally) on the first target. Note that all the signals may be at different IF frequencies at the nodes, but arrive back at the target at the same frequency; that same frequency may be the frequency of the sounding transmission from the first target, or it may be another frequency. (Preferably, the array transmits on the same frequency as the sounding frequency, or a frequency sufficiently close to the sounding frequency so that the channel response does not differ appreciably between the two frequencies.) At other locations, including the locations of the other targets, the transmissions from the nodes of the cooperative array will generally not combine constructively, and an observer at the other locations should see only incoherent signals without coherent data that can be detected and decoded. In general, the signals will combine constructively only at the location of the target that emitted the sounding pulse and whose time-reversed CRs were utilized by the array for the retrodirected transmission of the data stream.

If the CRs/CIRs from the different targets are not separable and consequently are combined as a composite sounding signal in a buffer at each node of the cooperative array, then a single data stream may be broadcast to all the targets. To do so, each of the nodes is configured to convolve the data stream with the node's composite (and time-reversed) CR which is the combination of the sounding signals from all the different targets that emitted the sounding signals. The TR transmissions from the multiple nodes of the array will then focus the same data stream at the multiple targets whose time-reversed CRs/CIRs were included in the composite sounding signals in the nodes' buffers. If a target did not emit a sounding signal, no coherent data stream will generally appear at that target.

The sounding signals from the different targets may not be easily "separable" at the nodes of the cooperative array. An example of such circumstances is when the sounding signals are overlapping in time, use the same frequency, and do not carry information from which the targets can be distinguished. Although the resultant multipath signal may appear chaotic and complex at the nodes of the array, the spatial distribution of the antennas may create a deterministic signature which can be used to identify the component of the signal arriving from each target. At each node, the composite signal can be deconstructed using an eigenvalue decomposition method that is capable of separating out the different signal components. For example, Singular Value Decomposition or SVD may be used for separation of the different components. Singular Value Decomposition and identification of specific sources of emission (e.g., the targets) from a combined signal are described in the related patent documents and in a commonly-owned U.S. patent application Ser. No. 13/462,514, entitled ANTI-GEOLOCATION, 2 May 2012, which is also incorporated herein by reference in its entirety.

Briefly, the application of eigenvalue decomposition to a composite signal can decompose the signal into its individual components, which, when time-reversed, focus on the multiple sources (e.g., A, B, C and D) independently. It is then possible selectively to choose to omit or modify the properties (e.g., gain) of each eigenstate independently. If the TR version of eigenstate corresponding to the source B (by way of example) is not launched from each node (or a subset of nodes) of the array, then no signal is focused at the source B. In this example, a gain of zero is effectively applied to the eigenstate B, and unity gain to each of the other eigentstates. The node may be configured so that it has the ability to apply independently to each eigenstate any arbitrary gain from zero to essentially infinity, or gain modulated by a data sequence. Other nodes of the array may be similarly configured and perform analogous processes. The individual gain functions can be different, but the data sequences applied at each node may be the same.

As should be apparent to a person skilled in the art after perusal of this document, the TR communication techniques operate to suppress the signal at unauthorized receivers (snoopers), whether the location of the intended target is known or not known. A snooper may be able to remove the scrambling if the snooper uses a directional antenna to observe a single node of the cooperative array. The snooper's gain, however, may then be much lower than the gain on the authorized channel (that is, the channel to the intended target or one of the intended targets). It can be estimated that, in many situations, the difference in gain may often be 20-30 dB. In examples, the cooperative array is configured to operate a channel to an intended target at the SNR threshold for error-free performance, or slightly above (e.g., 1-3 dB) above the threshold. In the above example this may result in the snooper receiving a signal 20-30 dB below the SNR threshold for error-free performance, thereby reducing the snooper's opportunity to eavesdrop, because the snooper does not benefit from the coherent gain that the array provides to the intended target(s).

A more complex coding system may be implemented to add protection to the data transmitted by the cooperative array so the data stream cannot be acquired by a snooper observing a single array node. For example, a data stream to be transmitted from the array may first be split into I (two or more) separate and uniquely different streams using a code that has the property that when the original data stream is broken into I different substreams, and then the I substreams sum together with equal amplitude, the sum re-creates the original data stream. A TR-enabled array may emit different substreams from each array member (or from a different subset of array members). However, since TR can enable I substreams to overlap and add spatially at the target, TR with the additional requirement of amplitude balancing of the emitted signals may recreate the original data stream at the target.

The amplitudes of the different substreams arriving at the target may be balanced, but at the same time they may appear unbalanced when they are emitted. Assuming ($\alpha_{m0}$, $\alpha_{m1}$, ..., $\alpha_{mn}$) are the amplitudes of impulses received at the array and which originated as a sounding pulse from the target m, then emitting the time reversed version of the sequence $$K\left(\frac{\gamma_{m0}}{\alpha_{m0}}, \frac{\gamma_{m1}}{\alpha_{m1}}, \dots, \frac{\gamma_{mn}}{\alpha_{mn}}\right)$$

ensures that all the signals arriving at the intended target are of (substantially) equal amplitude and should spatially sum to provide a coherent signal. Here, K is an amplitude adjustment constant applied equally across all array nodes. This allows the system to ensure that signal levels lie within the range appropriate for the RF electronics at the nodes. The terms $\gamma_{mn}$ allow individual nodes to apply local adjustments for signal optimization purposes. The benefit of this technique is that the spatial code ensures that no single substream contains all the information in the original data stream, and generally the only location where amplitude balance and constructive time alignment are possible is the intended target that emitted the sounding signal.

Note that TR may provide multipath gain in addition to the array gain.

Time-reversal techniques may be applied not only to data communications, but also to power focusing (electro-magnetic pulse or EMP), and any other applications requiring selectivity.

Control and configuration of the array for cooperative tasks (such as transmission of data to target(s)) may rely on communications between and among the array nodes. For example, the array nodes may need to agree on which target to send data to, what power levels should be used in transmitting to the target, and exchange other information needed for various communication layers. The inter-nodal communications are also needed to synchronize/align the nodes to make coherent transmissions possible, including clock synchronization/alignment, phase synchronization/alignment, and/or frequency synchronization/alignment. Other tasks for which inter-nodal communication may be needed include distribution across the array of the data for transmission to the target(s), and collection of data received by the array cooperatively from the target(s).

In some embodiments, one of the nodes in the array is defined as the master node which can be set as a de-facto reference for alignment/synchronization of the other nodes of the array, referred to as slave nodes. Embodiments of the cooperative array implement a procedure where the slave nodes are phase, frequency, and time aligned/synchronized to the master node. When this is done, the array may be set up to ensure that, if the cooperative array protocol is used, the array will automatically location-focus the signals on an external target, with fading eliminated or reduced and without requiring knowledge of the target's position. The node designated as the mater node may change during operation, for example, in response to the varying dynamic conditions of the environment and/or of the array. The master node may also be responsible for other functions, such as control and coordination of the array, distribution of data for transmission to the target, collection of data received from the target, and still other functions.

In TR-based location-focusing embodiments, the cooperative array may emit signals at the same start and finish times across the array, based on a common time reference. The accuracy of the time synchronization across the cooperative array need not be perfect, but may be accurate to a reasonable fraction (e.g., 1/10) of the sounding pulse envelope—not of the carrier frequency period. This feature may permit, for example, nano-second alignment accuracy, instead of femto-second alignment accuracy. The array nodes do not necessarily require to measure the arrival times of the sounding pulses at each of their receivers, and each node does not necessarily require knowledge of the arrival times of the sounding pulses at any other node of the array. But the nodes do need to capture the sounding pulse and may need to agree on the "capture window," that is, the time period within which the nodes of the array attempt to capture the sounding pulse. The master node (or another assigned node) may be given the responsibility for determining the start and the duration of the capture window (or, alternatively, the start and finish times), to ensure that the array nodes are "listening" when the sounding pulse is emitted, and that the capture window (which is essentially defined as the time period over which the nodes are capturing any arriving signals generated by the sounding pulse) is long enough so that every node of the cooperative array will capture the sounding signal, including its significant multipath components, if present. In embodiments, the master node can ensure that the capture window is long enough by assuming the window is longer than the worst case of the sum of the two longest propagation delays between the master node and the slave nodes. This may be particularly useful for cases where the target is Line-of-Sight (LOS) or weakly Non-LOS (NLOS) to the cooperative array.

For situations in which there is severe multipath that extends over time periods that greatly exceed (e.g., by a factor of 10 or more) the inter-nodal propagation time, the master node may be configured to extend the capture window by the excess time, or longer. There are many techniques by which the master node can acquire the knowledge regarding the length of multipath and node-to-node delays. For example, the master node can be configured to set an initial capture window of a very long duration, and share this information with the other nodes of the cooperative array. After the nodes of the array capture the sounding signal, each slave node calculates the extent of the sounding pulse plus any multipath decay spreads and communicates this information to the master node. The master node then determines the actual capture window required, possibly including an additional time margin, and communicates the new capture window parameters (start/stop times, or one of the start/stop times and duration, for example) to the slave nodes. The nodes of the array then proceed to acquire a new sounding pulse using the new capture window. In an alternative approach, the nodes actually capture the sounding signal over a long time period and the master node simply decides how to reduce this period into a shorter capture window by using only the segment between different time stamps applied to the whole signal, without using a new sounding for this purpose.

One of the more challenging cases is presented when a large array with a wide spatial distribution of nodes is used to focus a signal on a target whose presence is known (from the signals emitted by the target, for example), but whose location is not known to the array. A directional beamforming array may attempt to send a beam in the general direction of the target with the beam's power maximally concentrated in that general direction (as the direction is estimated). A TR node array, however, may be configured to focus its collaborative transmission on the desired target, without actual knowledge of the location of the target. Thus, when the full angle Field of View (FOV) of the cooperative array (as observed from the target) becomes large, and in particular when the array is randomly distributed through space, it may be difficult for a conventional system to produce even directional beamforming in a meaningful manner. Time-reversal communications, however, may work well for the high FOV distributed arrays. Furthermore, a cooperative TR array with its nodes distributed in three dimensions may be able automatically to focus its transmissions in three dimensions, including the elevation dimension.

The captured signals used in the sounding process may be "cooperative signals" or "collaborative signals," that is, signals sent by the target for the purpose (or one of the purposes) of allowing the nodes of the array to obtain estimates of the channels between the target and the nodes; the captured signals may also be "opportunistic," sent from the target for some other purpose.

FIG. 1A illustrates in a high level, block-diagram manner, selected components of a communication arrangement 100. This arrangement includes an array of ad hoc nodes 105 that communicate with each other. As shown, the array 105 includes five distributed cooperating nodes, 105-1 through 105-5. In similar arrangements, the array 105 may include any number of a plurality of nodes 105, for example, 2, 3, 4, 5, 6, 7, 8, 9, 10, or more. The arrangement 100 also includes a base station 110, a target.

The nodes 105 may be within Line-of-Sight or Non-Line-of-Sight of each other, and may communicate directly with each other via side channel links 120. As shown, the links 120-1, 120-2, and 120-4 connect the node 105-3 to each of the nodes 105-1, 105-2, and 105-4, respectively; and the link 120-5 connects the node 105-4 to the node 105-5. The node 105-3 may thus communicate directly with each of the nodes 105-1, 105-2, and 105-4. The node 105-3 may communicate with the node 105-5 indirectly, through the node 105-4 and the links 120-4 and 120-5. This is just one example. More generally, any of the nodes 105 may be connected by such side channel link 120 to any of the other nodes 105, and any of the nodes may lack a direct link to any other node (or nodes), and communicate with such other nodes through intermediate nodes and multiple (two or more) links. The side channel links 120 may be implemented, for example, using short-range RF link such as a Bluetooth® link, WiFi, or other short-, medium-, and longer-range RF technologies. The side channel links 120 may also be implemented using non-RF technologies and transmission media, including optical technologies, such as free-space or guided optics, and sound/acoustic (ultrasound) technologies. A more detailed discussion of the architecture of the side channel links 120 and their underlying technologies, with examples, will be provided below.

Figure 2:
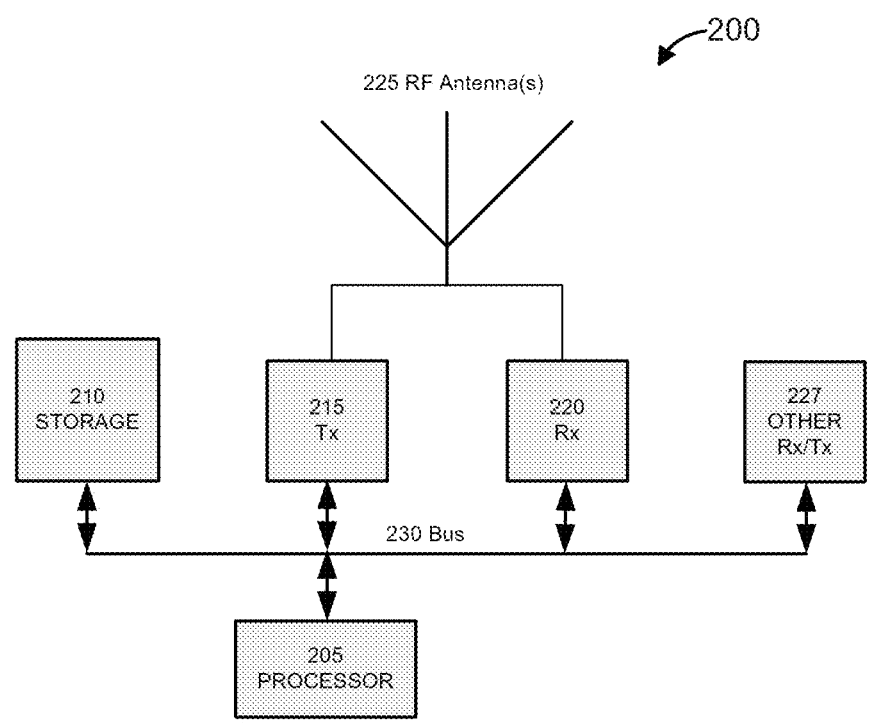
FIG. 2 illustrates selected elements of a communication apparatus configured in accordance with one or more features described in this document.

FIG. 2 illustrates selected elements of an apparatus 200 configured in accordance with one or more features described in this document. The apparatus may be any of the cooperative nodes 105 and/or the base station 110. The apparatus may include a processor 205; a storage device 210 (which may store program code for execution by the processor 205); an RF receiver 220 configured to receive radio frequency signals, such as sounding pulses; an RF transmitter 215 configured to transmit radio frequency signals, such as collaborative communications to a base station; one or more RF transmit and receive antennas 225 coupled to the receiver 220 and the transmitter 215; and a non-RF processing module 227, such as an optical or acoustic transceiver and associated signal processing devices. A bus 230 couples the processor 205 to the storage device 210, the receiver 220, the transmitter 215, and the non-RF processing module 227; and allows the processor 205 to read from and write to these devices, and otherwise to control operation of these devices. In embodiments, additional receivers and/or transmitters are present and coupled to the processor 205.

The nodes 105 may be configured to communicate coherently (in a synchronized and coherent manner) with the base station 110. The communication is "coherent" in the sense that the nodes 105 can transmit the same data to the base station 110 in a synchronized manner so that the radio frequency transmissions from all or a plurality of the nodes 105 add coherently in time and space at the receiving antenna(s) of the base station 110; such coherent communications include directional beamforming and location-focusing.

Figure 3:
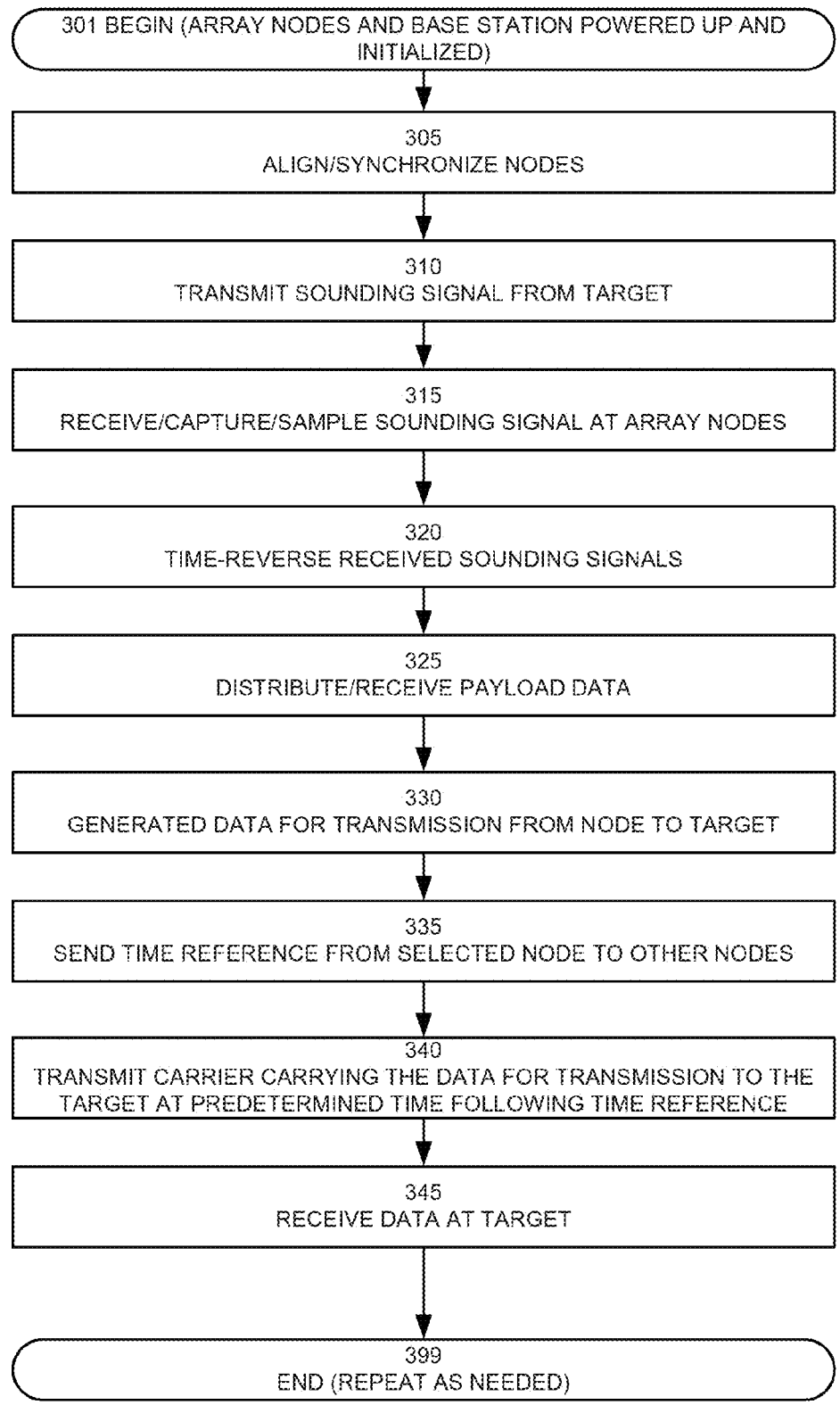
FIG. 3 selected steps of a process of time-reversal communications between an array of collaborative nodes and a base station 110.

FIG. 3 illustrates selected steps of a process 300 for an array of collaborative nodes, such as the nodes 105, to transmit data to a target, such as the base station 110, using time reversal.

At flow point 301, the nodes of the array 105 and the base station 110 are powered up, initialized, and ready to communicate.

In step 305, the nodes 105 are aligned/synchronized. A single node 105 (for example, a selected master node) may be used to set a common time/frequency/phase reference for all the nodes of the array. Alignment/synchronization of nodes may be performed as is described in the related patent documents, particularly in (1) International Patent Publication WO/2012/151316 (PCT/US2012/36180), entitled DISTRIBUTED CO-OPERATING NODES USING TIME REVERSAL, filed 2 May 2012; (2) U.S. patent application Ser. No. 14/114,901, Publication Number 2014-0126567, entitled DISTRIBUTED CO-OPERATING NODES USING TIME REVERSAL, filed on 8 May 2014; and (3) U.S. patent application Ser. No. 14/247,229, entitled DISTRIBUTED CO-OPERATING NODES USING TIME REVERSAL, filed on 7 Apr. 2014. Alternatively, the alignment/synchronization may be performed otherwise. In the end, all the nodes 105 are aligned/synchronized, and can emit simultaneous signals for coherent communications such as directional beamforming and location-focusing.

In step 310, the base station 110 transmits to the nodes 105 a sounding signal. The sounding signal may be a cooperative signal or an opportunistic signal. The sounding signal may be a sharp pulse approaching an impulse, a Gaussian pulse, chirp, barker code, Gold code, or another appropriate burst with substantially-flat frequency response in the communication band of interest. The sounding signal may be selected to have a good autocorrelation function (i.e., approaching that of an impulse function), as is known in communication theory and related fields (e.g., CDMA, autocorrelation radar).

In step 315, each of the nodes 105 receives, captures, samples, and stores the received sounding signal. Each of the nodes 105-N may thus store the channel response $CR_N$ between itself and the base station 110 (or analogous information). The same master node as was used for synchronization in the step 305 may instruct each of the nodes 105 to use the same or substantially same temporal window to receive/capture/sample the sounding signal from the base station 110. The windows across the array 105 may be identical in lengths and may have the same center times. Each node 105 may be instructed by the master node when to start looking for the sounding pulse, and when to stop. This timeframe may be referred to as the "capture window," that is, the time period during which all the transmitters are attempting to receive the sounding signal. There are other ways to receive the sounding signal at the nodes 105. For example, the capture windows do not necessarily need to be at the same times or be of the same lengths, but should have a common symmetry point on which to mirror their transmissions.

In step 320, each of the nodes 105 performs time reversal on its stored sounding signal, obtaining and storing its time-reversed channel response $TR\text{-}CR_N$. In practice, this step is an approximation of time-reversal, because causality limits the length of each recorded $CR_N$. The $TR\text{-}CR_N$ of a particular node 105 is a time-reversed captured window of the particular node 105. The time-reversal may be performed at carrier frequency, an intermediate frequency, or baseband.

In step 325, each of the nodes 105 obtains payload data that the array 105 intends to transmit to the base station 110. The payload data may be distributed, for example, from one or several of the nodes 105 to the remaining nodes, using the side channel links 120. The payload data may be distributed from the master node. The payload data may originate at the master node, another node 105, two or more of the nodes 105, or all of the nodes 105.

In step 330, each of the nodes 105 may generate its data for collaborative transmission to the target. For example, each node may convolve its respective time-reversed channel response $TR\text{-}CR_N$ with the common payload data, to obtain its respective data for transmission, $DT_N$.

In step 335, a selected node 105 may send a reference transmission, such as a short pulse, to the remaining nodes 105; the remaining nodes 105 may receive the reference transmission sent by the selected node 105. The selected node 105 may be the master node or another node. Several or each of the nodes 105 may be capable of being the master node, and the selection or rotation of the master node role among the nodes 105 capable of being the master node may be predetermined or performed in the field using various predetermined conventions.

In step 340, each of the nodes 105 transmits its carrier with the respective convolved data $DT_N$. This step is performed by the nodes 105 simultaneously, for example, following a predetermined time duration S after the emission of the reference transmission. The length of the predetermined time duration S is preferably longer than the Signal Flight Time (SFT) between the selected node 105 (e.g., the master node) and each of the remaining nodes 105. In this way, all of the nodes 105 transmit their respective data $DT_N$ coherently, at the same time. All of the nodes 105 can measure the length of the time period S based on the same time reference; for example, each of the nodes 105 measures S based on the clock of the selected node 105. The nodes 105 have the information needed to correct their internal time/clock references, because of the synchronization/alignment in the step 305.

The time-reversal process equalizes both the delays of the multipath signatures and the propagation delay differences, so that all the signals from the nodes arrive at the base station 110 at substantially the same times, creating array gain and multipath gain. No intentional gain is obtained at an unintended (hostile) transceiver, because no matched filtering or alignment generally occurs at any other location but the intended receiver (the base station 110, the target).

A multi-node transmit array may thus permit significant power reduction and/or range increase in an NLoS multipath channel.

In step 345, the base station 110 (the intended receiver/target) receives the transmissions from the nodes 105. Because of the properties of time-reversal communications, the received transmissions add constructively in time-space at the base station 110. The properties of time reversal communications cause such coherent focusing, without the need to synchronize the nodes 105 to the base station 110. The time reversal process removes many of the sources of timing errors. The data pulse shape is derived from recording the sounding, so fixed timing delays are removed during the time reversal process.

In effect, the ad hoc distributed nodes 105 act similarly to a single transmitter with multiple spatially-diverse antenna elements. Among potential benefits of this technique is the ability to communicate collectively with the base station 110 in situations where a single node 105 may not be powerful enough to close the connection to the base station 110 on its own, for example, due to insufficient signal strength, high noise or interference levels, and/or other reasons for poor link reliability.

The process 300 may then terminate at flow point 399, and be repeated as needed.

The side channel links 120 may be RF links. In embodiments, the links 120 operate on one or more RF frequencies that are different from the frequency (frequencies) of the "main" RF channel, that is, the channel between the array and the target. While the main RF channel is by definition in the RF domain, it is possible to operate the side channel links by which the array is aligned/synchronized using other communication media, for example, optics and acoustic. One reason why non-RF media may be desirable for the operation of the side channel links 120 is to guard against RF emissions, which can be detected and can even be used for the purposes of geolocation or hostile targeting of the array. Another reason is that highly collimated optical beams may exhibit substantial immunity to interference. Yet another reason is that there are various weather conditions that may prevent RF communications, while allowing other media communications that are sufficiently robust for the purposes of aligning the array via the side channel links 120. For example, heavy rain may seriously impact some RF propagation modes, while allowing short-range optical communications.

The non-RF media may place various restrictions on the side channel links 120 and on the ways the signals propagating through these links may be used. The typically omnidirectional behavior of RF antennas usually means that a single RF signal may be emitted from one of the nodes 105 (e.g., the master node) and, if there are no path blockages, the signal will likely reach another node 105 independently of what is happening at any other node 105. Even if multiple nodes lie in a line, it is rare for any one node 105 to block the RF signal and prevent other nodes 105 from receiving the signal. Thus, one node 105 emits the signal, and each remaining node 105 can receive some component of the signal without significantly attenuating the signal reaching the remaining nodes 105. This situation may change with a move away from RF frequencies, especially in the case of optical signals. Optical signals may be focused into collimated free-space beams or be sent along fiber optic or other waveguides. Techniques for fractional tapping of guided signals have been developed, whereby some of the signal is tapped and terminated at a node and the remaining untapped fraction is propagated onwards, to other nodes. This same technique can be used for free-space beams. Attempting this type of splitting in field-deployed free-space optical links, particularly links where the end point nodes are in motion, is a challenging problem, however. Additionally, placing an optical detector directly in the path of another node tends to cause severe shadowing at the short wavelengths of optical signals. Optical detectors typically absorb nearly all the energy falling on them, and, unlike a dipole antenna, do not re-emit a meaningful fraction of the signal. Optical beams also experience little diffraction, which means that they usually do not re-converge behind the object and do not fill-in the shadow.

Figure 1B:
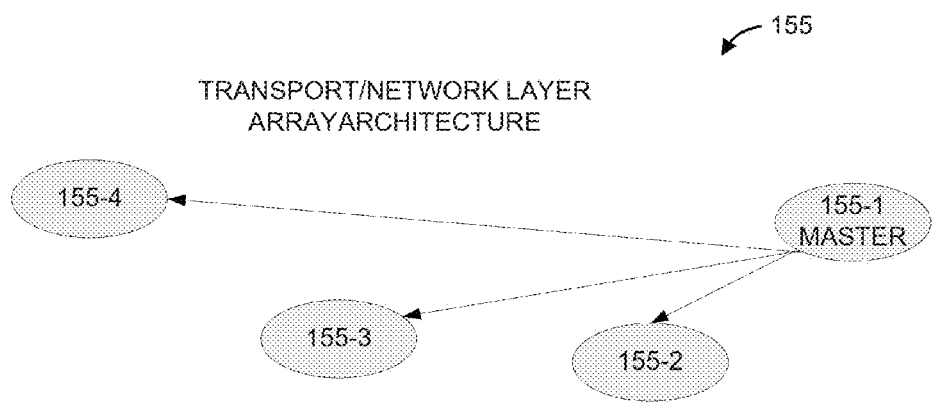
FIGS. 1B, 1C, and 1D illustrate selected aspects of various communication layers of an array of nodes.
Figure 1C:
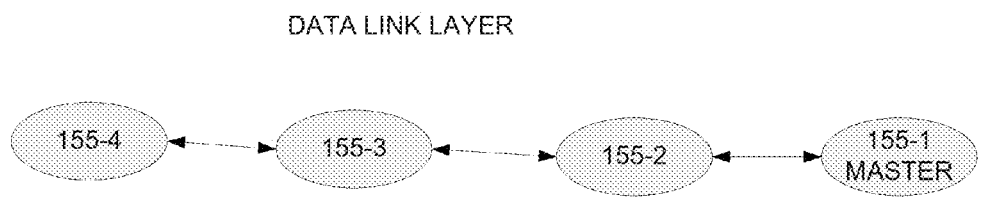
Figure 1D:
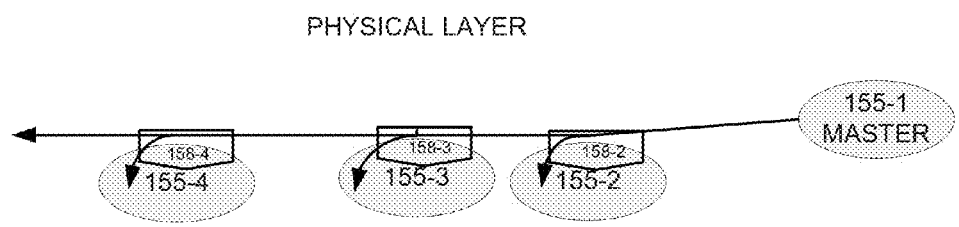

FIGS. 1B, 1C, and 1D illustrate at a high-level an example of the communication layer architecture of an array of nodes 155-N. In these figures, four nodes a shown: a master node 155-1 that is responsible for alignment/synchronization of the array in this example; and slave nodes 155-2, 155-3, and 155-4. The communications between the nodes 155 may be implemented using free-space optics, for example. FIG. 1B shows an exemplary physical layout of the array; note, however, that the physical arrangement may be a dynamically-varying one, with the nodes 155 moving with respect to each other in any or all three dimensions. FIG. 1C shows the data link layer of the array of the nodes 155. FIG. 1D shows the physical layer of the array. In the latter figure, the nodes 155-2, 105-3, and 105-4 include optical directional couplers (used as splitters) 158-2, 158-3, and 158-4, respectively. The master node 155-1 may also include such an optical directional coupler (not shown).

In operation, the master node 155-1 may attempt to create an independent connection (over side channel link) to each of the slave nodes 155-2/3/4 at the transport and network layer. At the data link layer, however, the signals from the master node 155-1 may pass through intermediate nodes, and each of the slave nodes 155 may decide whether to terminate a received signal at that node, or pass it through because the signal is intended for another slave node 155. As shown, a signal from the master node 155-1 may be terminated at the slave node 155-2, or it may be passed to the slave node 155-3. If the signal is intended for the slave node 155-3, the slave node 155-3 may terminate the signal; if the signal is not intended for the slave node 155-3, the slave node 155-3 may pass it to the slave node 155-4. The slave node 155-4 may in its turn determine whether the signal is intended for it, and terminate the signal in this case; or pass it still further to another node (not shown).

Similarly, the signals from some of the slave nodes 155 may pass through the intermediate nodes on their way to the master node 155-1 or another slave node.

At the physical layer, FIG. 1D, the system is shown as a single light pipe; the pipe may have the ability to run many (two or more) channels at different wavelengths and/or different bandwidths. Each slave node 155-2/3/4 has an embedded optical directional coupler (used as a splitter) 158-2/3/4 that enables the node to tap into the signal and select out a component of the signal that is of interest to that node, and pass the other components (possibly after amplification) to another node. In some embodiments, a fraction of the total power of signal is removed and used by the intermediate/transit slave node. In some embodiments, the node may be frequency selective and tap (or partially tap) one or more wavelengths of the signal, allowing other signals substantially to pass through. Other possible examples of tapping modes include polarization-based and optical mode-based selectivity.

The directional couplers 158 may be bidirectional, and the nodes 155 may be configured to determine whether a tapped signal component is travelling from a slave node 155-N to the master node 155-1, or from the master node 155-1 to one or more of the slave nodes 155-N. More generally, the side channel link hardware of the slave nodes may be direction-sensitive. Thus, a transit slave node may pass through (directly or indirectly) a signal from the master node to an end point slave node without imposing the clock properties of the transit node on the signal that is passed through to the end point slave; similarly, the transit slave node may pass through (directly or indirectly) a signal from the slave node to the master node without imposing the clock properties of the transit node on the signal that is passed through to the master node.

In embodiments, the nodes 155 are configured so that the optical signal which passes through an intermediate node 155 and is destined for another node 155 does not undergo termination and regeneration at the intermediate node 155, but passes transparently through the intermediate node 155, although optical amplification or other process at the analog level may be permitted as long as they do not affect (that is, do not substantially distort) the clock information embedded in the signal from the node which generated the signal. Thus, the intermediate nodes do not terminate the optical signal by converting it to an electrical signal and then retransmit the digital data of the signal on a new optical carrier. Such "termination and regeneration" of the signal imposes properties of the local clock of the intermediate node 155 which is performing the regeneration of the signal; as has been indicated, this is not done here. Thus, the clock information that is intrinsic to the node that generated the signal is preserved as the signal travels through the intermediate nodes 155, allowing one end node 155 (e.g., the node 155-4) to compare its clock to the clock of another node (e.g., the master node 155-1).

Given the high bandwidth of optical transmission systems, it is feasible to place onto an optical channel link an entire RF signal, both carrier and information-containing modulation envelope. In embodiments, the side channel links are implemented using such "RF-over-optics" communications. In other words, the side channel links are optical, with the RF signals of the nodes being placed onto (e.g., modulating) the optical carriers of the side channel links. In embodiments, the side channel links are implemented using "IF-over-optics," with an intermediate frequency (IF) generated in the RF domain being placed onto (e.g., modulating) the optical carriers of the side channel links. In embodiments, the side channel links are implemented with the baseband signal placed onto (e.g., modulating) the optical carrier.

Figure 4:
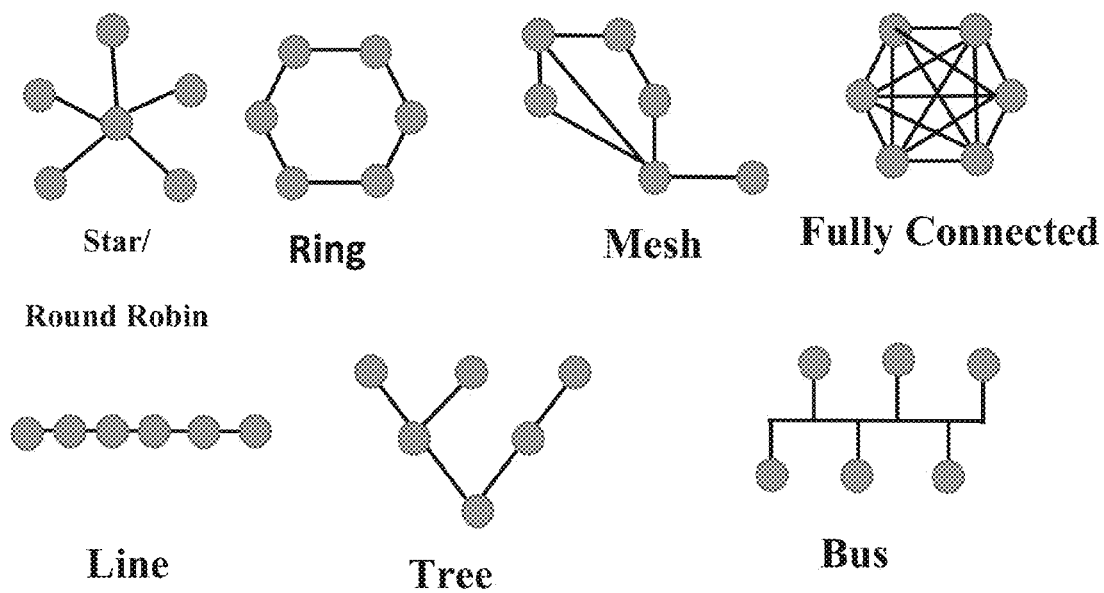
FIG. 4 illustrates various array architectures.

Many different physical network architectures may be used to interconnect the nodes of the collaborative array. FIG. 4 shows selected aspects of examples of the following physical array configurations/architectures: (1) Star/Round Robin configuration/architecture, (2) Ring configuration/architecture, (3) Partially-Connected Mesh configuration/architecture, (4) Fully-Connected Mesh configuration/architecture, (5) Line configuration/architecture, (6) Tree configuration/architecture, and (7) Bus configuration/architecture. Note that FIG. 4 illustrates simple interconnectivity, and not Open System Interconnection (OSI) model hierarchy.

Recall that the side channel links may be used by the array nodes to align/synchronize their local phases, frequencies, and reference clock times; for example, each slave node 105-2/3/4 may align/synchronize to the reference of the master node 105-1; and the slave nodes 155-2/3/4 may align synchronize to the master node 155-1. In some cases, the actual node which plays the role of master node may be selected arbitrarily or randomly and each array node (e.g., 105, 155) can interact with any other node of the array. The Bus and the Fully Connected Mesh architectures are examples of such cases. The Star architecture is an example of a network architecture where the master node may be the central node and the slaves nodes do not connect to each other directly, but rather indirectly through the central master node. The Star architecture does not necessarily exclude configurations where the master node is not the central node and communicates with all or some of the slave nodes through the central node.

Figure 5:
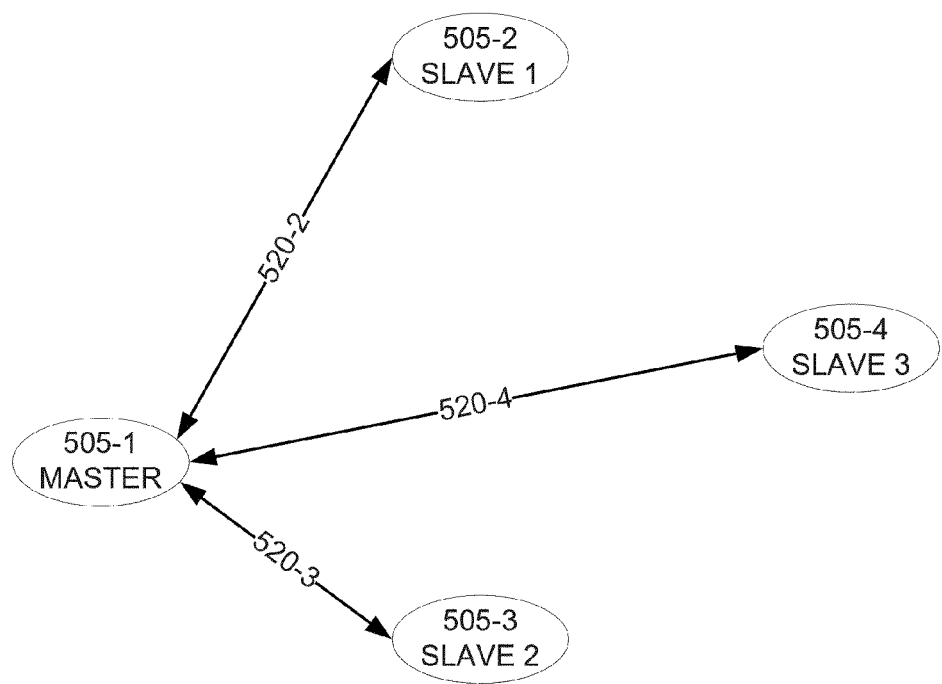
FIG. 5 illustrates selected aspects of a Star architecture

FIG. 5 illustrates selected aspects of the Star architecture, where a master node 505-1 is connected directly (no intermediate/transit nodes) with each of the slave nodes 505-2, 505-3, and 505-4. Here, the side channel links 520-2, 520-3, and 520-4 may implement RF-over-optics communications between the master node 505-1 and, respectively, the slave nodes 505-2, 505-3, and 505-4. The alignment/synchronization of the array may be performed in a sequential round-robin fashion, using time-division duplexing (TDD). The array may also be aligned/synchronized simultaneously or substantially simultaneously, using communications on different RF frequencies (i.e., frequency Division Duplexing or FDD). In some embodiments, the simultaneous communications may be carried out on different optical wavelengths, using wavelength division multiplexing (WDM), whether or not the optical signal was modulated with baseband, IF, or RF carrier. Simultaneous alignment/synchronization is particularly useful for arrays with large numbers of nodes, high frequency clocks, and/or low-cost clocks using quartz crystals, because sequential process may exceed the available clock coherence time or other time limits that constrain the alignment process of the array.

Figure 6:
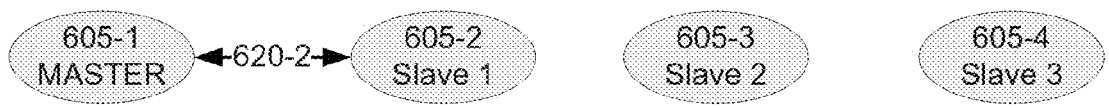
FIG. 6 illustrates selected aspects of an End Point example of an array with Line architecture.

An "End Point" variant of the Line architecture is shown in FIG. 6. Here, a master node 605-1 is the first (or last, depending on the vantage point) node in the line, and the slave nodes 605-2/3/4 may align/synchronize to the master node 605-1. It is the alignment/synchronization process that defines a node as an End Point node, meaning that the master node is attempting to synchronize the clock at that node with the master node's own clock.

The slave node 605-2 is the nearest neighbor to the master node 605-1 and aligns/synchronizes directly to the master node 605-1, over a side channel link 620-2. Other slave nodes may also align/synchronize to the same master node 605-1, either directly or indirectly; we will return to this below in the description of FIG. 7.

Figure 7:
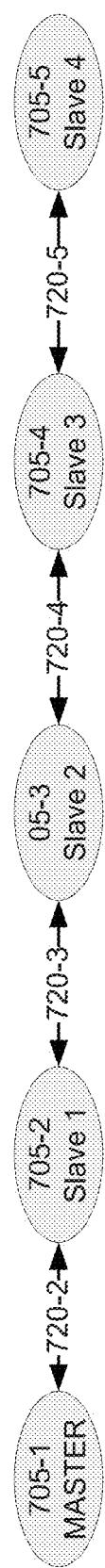
FIG. 7 illustrates another example of an array with the Line architecture.

FIG. 7 shows another Line architecture example. Here, a slave node 705-5 has no direct connection to a master node 705-1, and the side channel link connection between the nodes 705-1 and 705-5 passes through other slave nodes (705-2, 705-3, 705-4, with the latter two also not having a direct connection to the master node). This may be typical in an optical interconnect environment. The slave nodes 705-2/3/4 here play a new role, which we refer to as the "Transit Slave" node role. In this case, the optical (or other) signal from the master node 705-1 to the slave node 705-5 is routed to bypass the clocks located at the Transit Slave nodes 705-2/3/4. The Transit Slave nodes 705-2/3/4 are now considered part of the optical pipe that enables the master node 705-1 to connect to the slave node 705-5 further down the chain, with the slave node 705-5 operating as an End Point node. The goal is that the slave node 705-5 and the master node 705-5 can align/synchronize clocks without substantial distortion caused by the Transit Slave nodes 705-2/3/4 to the clock information passed from the master node 705-1 to the End Point slave 705-5. In other words, the slave node 705-5 obtains the clock information of the master node 705-1 from the optical (or other) signal which has traversed the Transit Slave nodes 705-2/3/4 on its way from the master node 705-1. To achieve this, each of the Transit Slave nodes 705-2/3/4 includes module(s) to enable it to be configured in a bypass mode, which permits the Transit Slave node to bypass its internal clock process in allowing the optical (or other) signal to transit as an analog signal whose transit delay is not corrupted by the clock of the Transit Slave nodes. The Transit Slave nodes 705-2/3/4 thus do not impose their internal clock properties on the signal that aligns/synchronizes the slave node 705-5 to the master node 705-1.

The slave node 705-5 may also receive other information from the master node 705-1, for example, payload data for transmission to the base station, and control information. It is not necessary that such other information be unaffected by the clocks of the Transit Nodes. In other words, the payload information may be re-clocked at the Transit Slave nodes.

Some nodes, such as the nodes 705-2/3/4, may be configured to function simultaneously as End Point nodes and Transit Slave nodes. Indeed, when a slave node itself is aligned to the master node, it is an End Point node; the same node may also serve as a Transit Node for passing signals to another slave node. A node may be configured, for example, to function as an End Point node for one signal on a first optical wavelength (where the side channel links are WDM links), while at the same time to function as a Transit Slave node on a second and different optical wavelength. As another example, a node may be configured to split the same optical signal of a side channel link into two components and act as an End Point node for one of the components, while at the same time functioning as a Transit Slave node for another component. In still other examples, a node may be configured to split an optical beam into two signals based on polarization (or optical propagation mode), and simultaneously act as an End Point node for a first of the two polarizations (or modes) and as a Transit Slave node for the second and different polarization (or mode).

In some embodiments, the side channel links are acoustic. Some properties of acoustic signals may be similar to those of RF signals in a star configuration, where the acoustic waves propagate omnidirectionally. The acoustic signals, however, may exhibit dispersion more significant than dispersion of RF signals. Acoustic signals may also operate in full or partial waveguide modes and, in such cases, they may behave more like optical signals.

In the examples given throughout this document, it is the master node that is aligning/synchronizing the clocks at the slave nodes with its own clock. In variants, however, the master node and one or more slave nodes align/synchronize to a common external reference clock. Moreover, the role of the master node, that is, the node that directs the synchronization operations and/or distributes across the array the data to be transmitted to the target, may be assigned to different nodes of the array at different times. In embodiments, the role of the master node may be assigned to different nodes depending on their physical position relative to other nodes of the array. For example, the master node may be selected to be the node that is closest to the center of gravity of the array, giving equal weight to each of the array nodes. The master node may be selected from among the nodes that are capable of communicating with all the other nodes of the array over the side channel links, and the selection of a new master node may be triggered as the current node loses access to one (or another predetermined number) of the other nodes of the array over the side channel links. Here, "loses access" means that at least one metric representative of the quality of the side channel link, such as signal-to-noise ratio (SNR) or error rate (e.g., bit error rate or BER) fails to meet a predetermine standard. The at least one metric may be derived from multiple other metrics.

In embodiments, two or more nodes of the array concurrently perform some functions of the master node. For example, one master node can align/synchronize a second master node (and possibly one or more of the remaining nodes) to itself, and the second master node can then align/synchronize some or all of the remaining nodes of the array to itself. Data to be collaboratively transmitted from the array may be distributed across the array by one master node or jointly by multiple master nodes, and/or by one or more slave nodes. Generally, a master node is a node to which one or more other nodes are aligned/synchronized.

Figure 8:
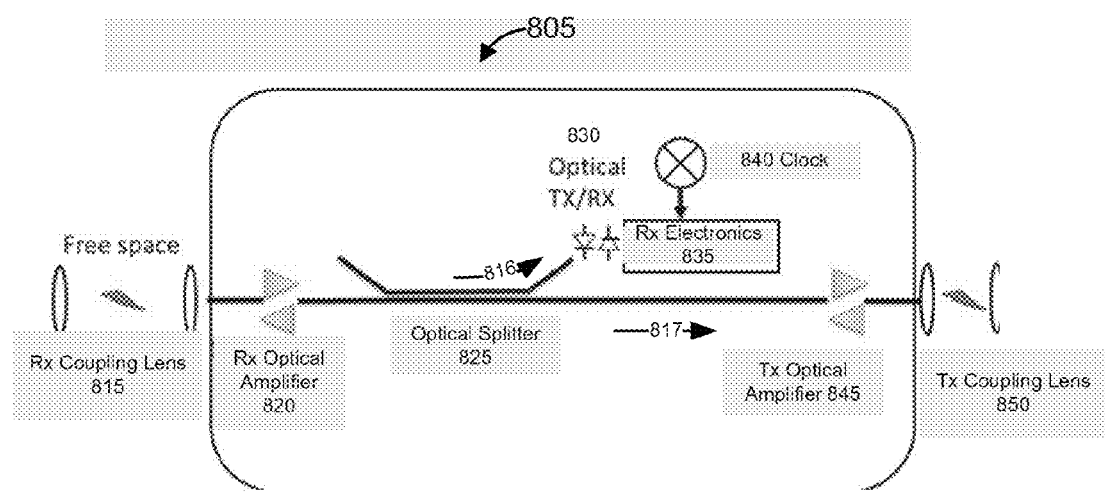
FIG. 8 illustrates selected components of a node that can be configured to operate in both a Transit Slave node and an End Point node configurations.

FIG. 8 shows selected components of an exemplary array node 805, which can be configured to operate in both a Transit Slave node and an End Point node. As a person of skill in the art would understand after perusal of this document, other components would typically also be present in the node 805, such as the components 205 (processor(s)), 210 (storage), 215 (RF transmitter), and 220 (RF receiver) of the apparatus 200 illustrated in FIG. 2.

As shown in FIG. 8, the node 805 includes a receive coupling lens 815 that is configured to receive optical signals from free space and couple them into a receive optical amplifier 820. The receive optical amplifier 820 amplifies the received signal and sends it into an optical splitter 825. The splitter 825 separates the signal into a first received component 816 and a second received component 817. The first received component is processed by the optical and electronic circuitry of the node 805 that terminate this signal (if needed), including terminating TX/RX optics 830, RX electronics 835, and internal node clock 840. For example, the first component may be used to align/synchronize the node 805, and to receive the data to be transmitted to the target. The second component 817 is guided to a transmit optical amplifier 845, which amplifies it and sends it toward a transmit coupling lens 850. The transmit coupling lens 850 couples the signal to free space, towards another node, which can operate as an End Point node, a Transit Slave node, or both.

As noted above, the optical splitter 825 may be a splitter in the conventional sense, that is, a splitter that separates the power of the received signal into two components 816/817 based on partially-transparent, partially-reflecting prism, with the optical properties of the two components (such as polarization, wavelength, mode) being the same or substantially the same. Another device may be substituted for the optical splitter 825, to separate the components 816/817 based on the optical properties (again, polarization, wavelength, optical propagation mode, etc.).

Importantly, the internal node clock 840 does not affect the second component 817 of the optical signal, and consequently the signal coupled by the lens 850 to free space preserves the clock properties of the received signal coupled by the receive coupling lens 815.

The architecture illustrated in FIG. 8 may be used as part of a free-space optical transmission link. The optical signal is converted back to a fiber system within the node 805, for separate Transit Slave and End Point processing. This also allows the inclusion of optical amplifiers 820 and 845 into a free-space architecture. In embodiments, these devices may be implemented as single-mode Erbium doped fiber amplifiers (EDFAs), Raman optical amplifiers, semiconductor optical amplifiers (SOAs), and or other optical amplifiers and/or combinations of different types of optical amplifiers.

Since the ad hoc nodes of the array may be in motion relative to each other, the array may implement a method for continually or continuously beam-steering or tracking the free-space optical side channel links with the precision necessary for reliable inter-nodal connectivity through the side channel links. When the various nodes of the array are in relative motion, the coupling of the free-space links into a fiber or other optical waveguide of the individual nodes is likely to experience significant variations due to a number of factors, including vibration and rapid random motion. This will be particularly true if the free-space coupling elements are mechanical gimbals with mechanically-limited response speeds. The amplifiers 820 and 845 may be configured to play an important role, that of equalizing the coupling variations. For example, the receive optical amplifier 820 may have a large margin of excess gain, and include or be followed by a high-speed programmable optical attenuator. The electronics portion of the node 805 can then analyze the power of the received signal, for example, the power of the first component 816 or the second component 817, and adjust the programmable optical attenuator to keep the signal strength between predetermined limits. Other automatic gain control and similar techniques may be used.

A feature of the embodiments described above is that the Transit Slave mode is a bypass mode, in which the signal (or the second component 817 of the signal) of the side channel link through the optical splitter remains in the analog domain, with reasonable power control. If the transit signal were converted to a digital signal, the clock properties of the intermediate nodes would be superimposed on the signal transmitted by the node, making it difficult or impossible to align accurately the clocks at the end point. This problem is avoided if the transit portion of the node through which the side channel link signal travels remains independent of the internal clock of the node through which the signal passes.

As has already been mentioned, the alignment/synchronization information may be transmitted over the side channel links as analog RF-over-optical signals. While distribution of data across the nodes of the array may also be needed (e.g., data to be transmitted cooperatively by the nodes to a target, array maintenance data, etc.), it is the RF carrier that is used to align/synchronize the nodes at either end of an optical channel link.

Digital signals, including high data rate communication signals, may also be sent directly over the optical side channel links. For example, the back-and-forth array alignment/synchronization signals may be sent as RF-over-optics, while higher-layer control signals and the data for the target may be sent as binary codes over a separate channel and have no need to be part of the RF-over-optics channel, though still travelling over the same optical side channel link. Examples of the higher-layer control signals include the signaling for keeping the optical power at predetermined levels, and signals used to turn the array on and off. The high speed communication data from the array to the target may also be distributed on separate high performance inter-nodal channels that are distinct from the side channel links used for alignment/synchronization and/or higher-layer control signals.

In summary, the array operational process may need to perform three basic functions with widely-varying bandwidth and timing requirements: (1) node alignment/synchronization, (2) control signaling, and (3) data distribution or collection. It may be quite challenging to place all the pipes onto a single RF link. An optical link, however, may be more suited for multiple pipes. For example, an optical link can put the different pipes on separate high bandwidth WDM wavelengths.

Figure 9:
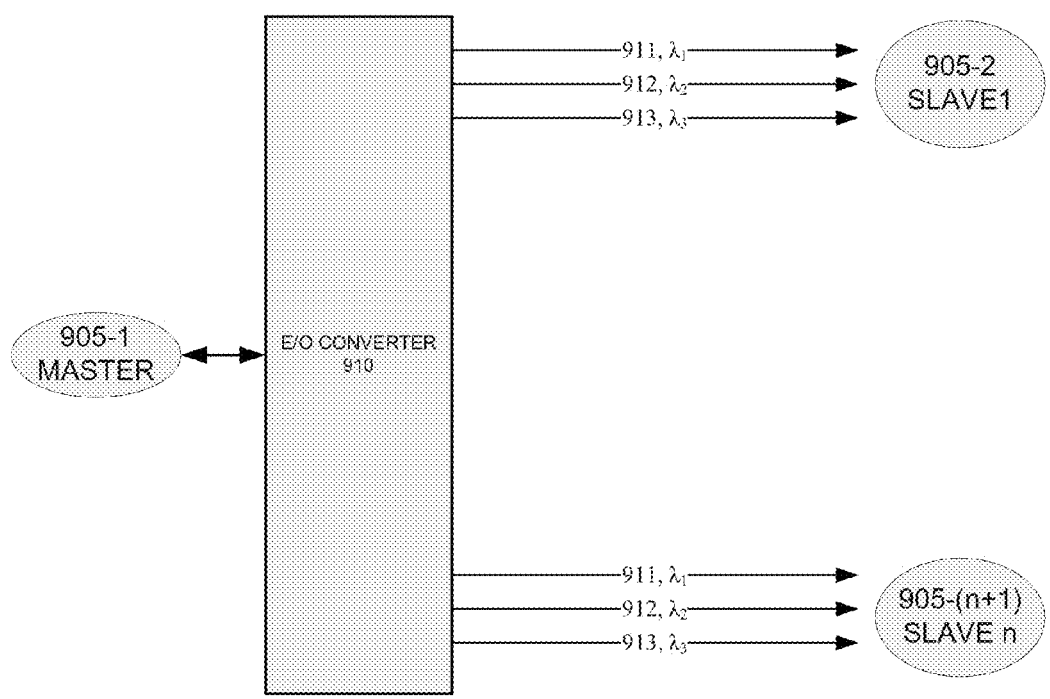
FIG. 9 illustrates selected aspects of an optical wavelength division multiplexing side channel link design.

FIG. 9 illustrates selected aspects of such design. Here, n separate side channel links are shown, one side channel link per slave node. (The side channel links may be the links 120/520/620 or any other optical side channel links such as shown in the figures and/or discussed in this document.) Each side channel link has three separate optical pipes. First, there are end-to-end analog optical pipes 911 on a first wavelength $\lambda_1$, with no components clocked by Transit Slave nodes. The optical pipes 911 may be implemented with RF-over-optics, and may be used for the End Point slave node clock alignment as explained above.

Second, there are relatively low-bandwidth (e.g., 10 MHz) pipes 912 on a second wavelength $\lambda_2$, for sending back and forth data for the higher level control processes that are used during the node alignment/synchronization. If the corresponding analog pipe channel (the channel on the analog pipe 911 that goes to the same End Point node to perform frequency and time rate alignment/synchronization) is also used to align the clocks, that is, to set the clocks to the same actual time, time-stamp data may be sent over the pipes 912.

Third pipes 913 may be relatively high-bandwidth optical pipes for distributing communication data that is to be transmitted by the array to the target, or collecting the data received by the array, or other data-intensive inter-nodal communications. These pipes may allow a single node (which may be the master node, or another node) to receive the data to be transmitted and then to distribute this data to the different nodes that are members of the array. In examples, the pipes 913 may operate at 1 Gb/s and higher rates.

The embodiments of FIGS. 8 and 9 are optical interconnect implementations; analogous functions can be defined for guided acoustic and even guided RF modes as well as hard wired systems, as long as the medium can be used simultaneously in both the Transit and the End Point modes. Acoustic interconnects may be particularly important in underwater applications.

In embodiments, some or all of the nodes of the array may be configured to function as Transit Slaves. In embodiments, some or all of the nodes may be configured to function as both End Point slave nodes and Transit Slave nodes. In embodiments, each node may be configured to function as an End Point slave node, as a Transit Slave node, and as a master node.

One of the challenges that need to be addressed for analog RF-over-optics channel implementation is that an RF signal may be bipolar (i.e., positive and negative), whereas an optical signal is a power signal (rather than amplitude signal) and consequently has no negative component. This mismatch may be resolved by using an input RF signal to modulate an optical power signal, as follows. First, an input RF signal is signal-conditioned. This includes normalizing the input RF signal to a predetermined amplitude "A" at about 0 VDC average, and level-shifting the normalized RF signal by a predetermined DC value. Normalization may be performed, for example, by an automatic gain control (AGC) circuit, and/or a saturated amplifier. Level-shifting may be performed by adding a predetermined DC voltage, for example, adding a voltage of the amplitude A or greater, to raise the signal to a level where it can be directly mapped/modulated onto optical power, without a negative component. The modulated optical component may then be transmitted by an appropriate WDM channel link, for example. At the end of the link (e.g., fiber, free-space optical) the received signal may be converted back into the RF domain. Conversion may be performed, for example, by a photodiode. The signal's DC component may then be removed by an appropriate bandpass filter (BPF), at which point the RF signal is available to the End Point node. This technique eliminates any direct effects from the optical phase. Coherent detection need not be used in this process.

Doppler shift of optical and RF signals may become a complication in applications where the collaborative array nodes are in motion relative to each other. In particular, Doppler shift may create problems for clock alignment/synchronization, because there is no simple way to distinguish between a Doppler-shifted frequency offset and a frequency offset due to clock misalignment. Fortunately, there are ways to compensate for the Doppler effects during alignment/synchronization.

For example, it may be possible to measure the Doppler shift due to the relative motion of the array nodes independently, by a Doppler detection system that may include velocity sensors, such as GPS sensors. The measured frequency offsets may then be corrected before alignment is performed.

As another example, a known pilot frequency pair may be added to each signal before transmission between array members. The frequency difference between the pair should remain constant if the clocks are simply offset. On the other hand, the difference should increase if the clock frequency shift is due to Doppler. The Doppler shift may then be computed from the measured change in the frequency difference between the pilots.

In still another example, the array implements a Doppler monitor using optical signals carried on the optical side channel links. Doppler measurements using optical and RF signals are known (for example, in traffic law enforcement), but they usually require not only high-precision clocks, but also availability of a reflected signal that can be mixed with the emitted signal to produce a beat frequency. If the optical signal is terminated at a photodiode, Doppler may not be readily measured, because of the absence of a reflected signal. Nevertheless, because of the wavelength stability of optical sources and because Doppler shift is proportional to the frequency, a node may measure/estimate Doppler shift of the received optical signal with a relatively high degree of precision.

Doppler shift is proportional to both (1) the relative velocity, and (2) the frequency of the signal, as shown by the equation $$\Delta f = f \frac{v}{c},$$

where $\Delta f$ represents the Doppler shift, f represents the frequency, c is the speed of light, and v is the relative velocity along the line between the two nodes. The optical signal should therefore exhibit a much greater Doppler shift than the RF signal, which in turn should exhibit a greater Doppler shift than the baseband data carried by the RF signal. There may be five orders of magnitude difference between the optical and RF frequencies. An optical Doppler monitor may operate using an optical wavelength of one of the side channel links. Alternatively, an additional optical wavelength may be used on the side channel link as a Doppler channel, to measure node displacement and speed during alignment/synchronization.

Figure 10:
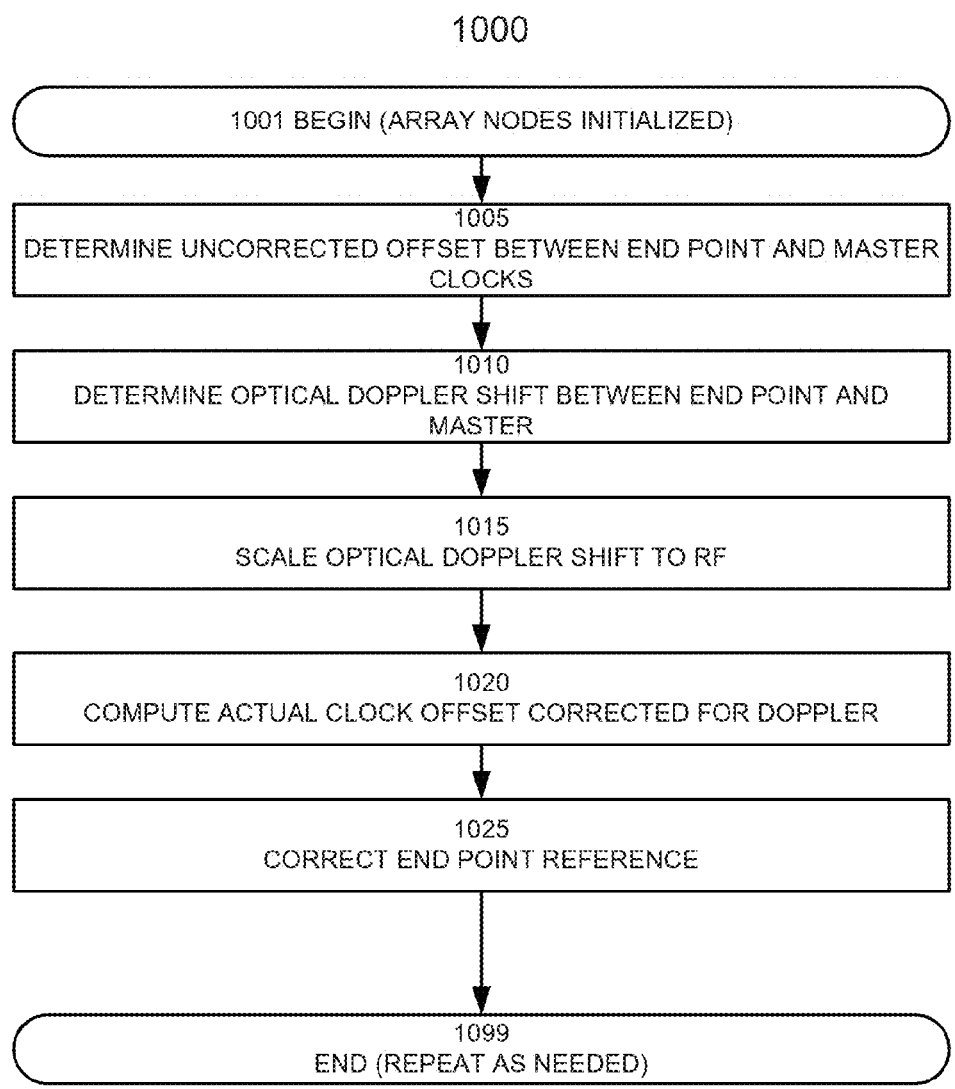
FIG. 10 illustrates selected steps of a Doppler compensation process.

Once the Doppler shift is known at an optical frequency, it can be scaled down to the RF frequency, and then inverted to correct the Doppler shift of the RF signal. FIG. 10 illustrates selected steps of an exemplary process 1000 for Doppler compensation. In step 1005, the End Point node determines the uncorrected frequency offset between its clock reference (e.g., LO) and the clock reference (e.g., LO) of the Master node. For example, the End Point node may count the number of RF oscillations of a known, predetermined frequency emitted by the Master node, within a predetermined time period. As is discussed throughout this document, the RF oscillations may be received directly from the Master node (for example, on an RF-over-optical side channel link); or through one or more intermediate nodes, but without the intermediate nodes re-clocking the signal. If the RF is 1 GHz and the period is 1 second, for instance, one billion oscillations would be expected. If the End Point node counted 1,000,002,000 oscillations, it could be concluded that the uncorrected offset was two parts per million, with the End Point having the slower of the two clocks. But this number has not yet been corrected for the Doppler shift; thus, the uncorrected offset at RF frequency ($\Delta f_{RFuncor}$) is equal to the sum of the actual clock offset at RF ($\Delta f_{RFclock}$) and the Doppler shift at RF ($\Delta f_{RFD}$): $\Delta f_{RFuncor} = \Delta f_{RFclock} + \Delta f_{RFD}$. Equivalently, $\Delta f_{RFclock} = \Delta f_{RFuncor} - \Delta f_{RFD}$.

In step 1210, the End Point node would determine the Doppler shift between itself and the Master node at an optical frequency. For example, the End Point node may be configured to measure and store the long-term frequency offset between its optical source at a specific wavelength, and the counterpart optical source of the Master node, and then measure the difference between the current offset and the long-term offset. The optical frequency difference ($\Delta f_{Opt}$) between the current optical offset and the long-term optical offset may be attributable to the Doppler shift.

In step 1215, the End Point node scales the optical frequency difference to the equivalent Doppler shift at the RF frequency ($\Delta f_{RFD}$ @ 1 GHz in this example). Because the Doppler shift is proportional to frequency, this is a matter of division: $\Delta f_{RFD} = \Delta f_{Opt} \times (F_{RF}/F_{Opt})$, where $F_{RF}$ is the RF frequency (again, 1 GHz here), and $F_{Opt}$ is the optical frequency at which the Doppler shift was measured (for example, $10^{14}$ Hz).

In step 1220, the actual clock offset at RF ($\Delta f_{RFclock}$) is computed from the measured uncorrected offset at RF frequency ($\Delta f_{RFuncor}$) and the measured and scaled Doppler offset at RF frequency ($\Delta f_{RFD}$): $\Delta f_{RFclock} = \Delta f_{RFuncor} - \Delta f_{RFD}$.

In step 1225, the LO of the End Point node is corrected. This may be done in various ways, actually (by adjusting the LO or a local synthesizer) and/or computationally. For example, the LO may be tuned to reduce or eliminate the LO offset from the LO of the master; a programmable synthesizer may be programmed to effect the required frequency offset; a mixing process may be used to obtain the compensated LO at the End Point node.

The process 1000 then ends in flow point 1099, to be repeated as needed.

Once the nodes of the array are aligned/synchronized, they may use time-reversal (TR) to retrodirect energy automatically back to the target(s). In this way, the array of nodes may be able to capture signals from the target or targets, and achieve spatio-temporal location-focusing of the energy on the targets. The nodes of the array may also or instead be configured for directional beamforming.

Some definitions have been explicitly provided in this document. Other and further implicit definitions and clarifications of definitions may be found throughout this document.

While the examples in this document focus on transmission from the array of untethered ad hoc nodes to one or more targets, analogous alignment of untethered ad hoc nodes of an array may also serve to receive a transmission from the target to the array. Furthermore, examples of inter-nodal communications may be useful for other nodes, such as nodes that are tethered, that is, nodes that are generally stationary with respect to each other, but which have individual clocks. The RF channels between such nodes may be varying, for example, due to changes in the environment surrounding the nodes, such as movement of objects that cause signal reflections, signal phase shift, and signal attenuation.

The features described throughout this document may be present individually, or in any combination or permutation, except where presence or absence of specific elements/limitations is inherently required, explicitly indicated, or otherwise made clear from the context.

Although the process steps and decisions (if decision blocks are present) may be described serially in this document, certain steps and/or decisions may be performed by separate elements in conjunction or in parallel, asynchronously or synchronously, in a pipelined manner, or otherwise. There is no particular requirement that the steps and decisions be performed in the same order in which this description lists them or the Figures show them, except where a specific order is inherently required, explicitly indicated, or is otherwise made clear from the context.

Furthermore, not every illustrated step and decision block may be required in every embodiment in accordance with the concepts described in this document, while some steps and decision blocks that have not been specifically illustrated may be desirable or necessary in some embodiments in accordance with the concepts. It should be noted, however, that specific embodiments/variants/examples use the particular order(s) in which the steps and decisions (if applicable) are shown and/or described.

The instructions (machine executable code) corresponding to the method steps of the embodiments, variants, and examples disclosed in this document may be embodied directly in hardware, in software, in firmware, or in combinations thereof. A software module may be stored in volatile memory, flash memory, Read Only Memory (ROM), Electrically Programmable ROM (EPROM), Electrically Erasable Programmable ROM (EEPROM), hard disk, a CD-ROM, a DVD-ROM, or other form of non-transitory storage medium known in the art. Exemplary storage medium or media may be coupled to one or more processors so that the one or more processors can read information from, and write information to, the storage medium or media. In an alternative, the storage medium or media may be integral to one or more processors.

This document describes in detail the inventive apparatus, methods, and articles of manufacture for communications and other techniques using distributed cooperating/collaborative nodes. This was done for illustration purposes and, therefore, the foregoing description is not necessarily intended to limit the spirit and scope of the invention(s) described. Neither the specific embodiments of the invention(s) as a whole, nor those of their features necessarily limit the general principles underlying the invention(s). The specific features described herein may be used in some embodiments, but not in others, without departure from the spirit and scope of the invention(s) as set forth herein. Various physical arrangements of components and various step sequences also fall within the intended scope of the invention(s). Many additional modifications are intended in the foregoing disclosure, and it will be appreciated by those of ordinary skill in the pertinent art that in some instances some features will be employed in the absence of a corresponding use of other features. The embodiments described above are illustrative and not necessarily limiting, although they or their selected features may be limiting for some claims. The illustrative examples therefore do not necessarily define the metes and bounds of the invention(s) and the legal protection afforded the invention(s).

What is claimed is:

1. A method of synchronizing an array of at least three ad hoc nodes, the method comprising steps of:
    receiving from a master node of the array a first non-radio frequency (non-RF) signal carrying a first radio frequency (RF) signal, the step of receiving being performed at a first transit slave node of the array over a first non-RF side channel link, the first RF signal including properties of a local time reference of the master node;
    passing through at least a first portion of the first non-RF signal through the first transit slave node to an end-point node without imposing clock properties of the first transit slave node on the first portion of the first non-RF signal and without converting the first portion of the first non-RF signal to an electrical signal and retransmitting the electrical signal on a new non-RF carrier, the first portion of the first non-RF signal carrying at least a first portion of the first RF-signal;
    synchronizing local time reference of the end-point node to the local time reference of the master node using the properties of the local time reference of the master node included in the first portion of the first RF-signal, the step of synchronizing the local time reference of the end-point node to the local time reference of the master node comprising frequency, phase, and time alignment of the end-point node; and
    synchronizing local time reference of the first transit slave node to the local time reference of the master node using the properties of the local time reference of the master node carried by a second portion of the first RF-signal, the second portion of the first RF-signal being carried in a second portion of the first non-RF signal, the step of synchronizing the local time reference of the first transit slave node to the local time reference of the master node comprising frequency, phase, and time alignment of the first transit slave node;
    wherein each node of the at least three ad hoc nodes includes a separate clock associated with said each node; and
    wherein said each node is free to move in at least one dimension in absolute terms, with respect to a target, and with respect to other nodes of the at least three ad hoc nodes.

2. The method as in claim 1, further comprising:
    terminating the second portion of the first non-RF signal at the first transit slave node.

3. The method as in claim 2, wherein the step of terminating is performed concurrently with the step of passing through.

4. The method as in claim 3, wherein the step of passing through comprises indirectly passing through the first portion of the first non-RF signal to the end-point node via at least one additional transit slave node.

5. The method as in claim 3, wherein the step of passing through comprises directly passing through the first portion of the first non-RF signal to the end-point node.

6. The method as in claim 3, wherein the step of passing through comprises separating the first portion of the first non-RF signal from the second portion of the first non-RF signal using an optical power splitter.

7. The method as in claim 3, wherein the step of passing through comprises separating the first portion of the first non-RF signal from the second portion of the first non-RF signal using an optical wavelength filter.

8. The method as in claim 3, wherein:
the step of passing through comprises transmitting the first portion of the first non-RF signal to the end-point node over a second non-RF side channel link; and
the first non-RF side channel link and the second non-RF side channel link are RF-over-optical links.

9. The method as in claim 3, wherein:
the step of passing through comprises transmitting the first portion of the first non-RF signal to the end-point node over a second non-RF side channel link; and
the first non-RF side channel link and the second non-RF side channel link are acoustic links.

10. The communication method comprising steps of:
synchronizing the array of the at least three ad hoc nodes as in claim 3;
distributing across the array common data for transmission to the target;
coherently transmitting from all nodes of the at least three ad hoc nodes of the array to the target RF signals carrying the common data, so that the signals carrying the common data add constructively in a general direction from the array to the target and/or in a general location of the target, the step of coherently transmitting comprising directional beamforming or location-focusing using time-reversal.

11. The method as in claim 3, wherein:
said each node is free to move in three dimensions in absolute terms, with respect to the target, and with respect to other nodes of the at least three ad hoc nodes; and
said each node is free to rotate around a plurality of axes.

12. An array of at least three ad hoc nodes, the array comprising:
a communication node comprising at least one communication node processor, a communication node radio frequency (RF) transceiver coupled to the at least one communication node processor, a communication node local time reference, and a communication node non-RF processing module coupled to the at least one communication node processor;
a master node comprising at least one master node processor, a master node RF transceiver coupled to the at least one master node processor, a master node local time reference, and a master node non-RF transceiver coupled to the at least one master node processor; and
an end-point node comprising at least one end-point node processor, an end-point node RF transceiver coupled to the at least one end-point node processor, an end-point node local time reference, and an end-point node non-RF transceiver coupled to the at least one end-point node processor;
wherein:
the communication node non-RF processing module comprises a non-RF transceiver configured to receive from free-space a first non-RF signal, a non-RF splitter configured to separate the first non-RF signal into a first component terminated at the communication node and a second component passed through the communication node into free-space without properties of the communication node local time reference being imposed on the second component and without converting the second component to an electrical signal, and electronic circuitry configured to obtain from the first component data in the first non-RF signal;
the master node is configured by the at least one master node processor to emit the first non-RF signal over a first non-RF side channel link, the first non-RF signal carrying an RF signal including properties of the master node local time reference;
the communication node is configured by the at least one communication node processor to synchronize the communication node local time reference to the master node local time reference using the properties of the master node local time reference included in the first non-RF signal received by the communication node;
the end-point node is configured by the at least one end-point node processor to receive the second component passed through the communication module using the end-point node non-RF transceiver and synchronize the end-point node local time reference to the master node local time reference using the properties of the master node local time reference in the second component of the first non-RF signal passed through the communication node;
each node of the array is free to move in three dimensions in absolute terms, with respect to a target, and with respect to other nodes of the array; and
said each node of the array is free to rotate around a plurality of axes.

13. The array of at least three ad hoc nodes as in claim 12, wherein the non-RF splitter comprises an optical power splitter.

14. The array of at least three ad hoc nodes as in claim 12, wherein the non-RF splitter comprises an optical wavelength filter.

15. The array of at least three ad hoc nodes as in claim 12, wherein the communication node, the master node, and the end-point node are configured to transmit coherently to the target RF signals carrying common data, so that the RF signals carrying the common data add constructively in a general direction from the array to the target and/or in a general location of the target, wherein the data in the first non-RF signal comprises the common data.

16. The array of at least three ad hoc nodes as in claim 12, wherein:
the non-RF transceiver of the communication node non-RF processing module is a first optical transceiver;
the non-RF splitter of the communication node non-RF processing module is an optical splitter;
the master node non-RF transceiver is a second optical transceiver;
the end-point non-RF transceiver is a third optical transceiver; and
the first non-RF signal is an optical signal carrying an RF signal.

17. The array of at least three ad hoc nodes as in claim 12, wherein:
the non-RF transceiver of the communication node non-RF processing module is a first acoustic transceiver;
the non-RF splitter of the communication node non-RF processing module is an acoustic splitter;
the master node non-RF transceiver is a second acoustic transceiver;
the end-point non-RF transceiver is a third acoustic transceiver; and
the first non-RF signal is an acoustic signal carrying an RF signal.

* * * * *